United States Patent [19]

Kapich

[11] Patent Number: 4,641,978
[45] Date of Patent: Feb. 10, 1987

[54] BEARING SYSTEM

[75] Inventor: Davorin D. Kapich, Carlsbad, Calif.

[73] Assignee: The United States of America as represented by the United States Department of Energy, Washington, D.C.

[21] Appl. No.: 663,857

[22] Filed: Oct. 23, 1984

[51] Int. Cl.[4] .......................... F16C 17/20; F16C 32/04
[52] U.S. Cl. ................................... 384/102; 384/624; 310/90.5
[58] Field of Search ................. 308/1 A, 10; 384/101, 384/102, 448, 107, 100, 624

[56] References Cited

U.S. PATENT DOCUMENTS

| 1,175,415 | 3/1916 | Egbert | 384/102 |
| 3,065,036 | 11/1962 | Trotter | 384/101 |
| 3,454,309 | 7/1969 | Ingham et al. | 384/102 |
| 3,708,215 | 1/1973 | Wilcock et al. | 384/102 |
| 4,015,882 | 4/1977 | Stenert | 308/1 A |
| 4,063,787 | 12/1977 | Bakken et al. | 384/221 |
| 4,194,796 | 3/1980 | Svensson et al. | 384/116 |
| 4,387,937 | 6/1983 | Fournier et al. | 308/1 A X |
| 4,425,010 | 1/1984 | Bryant et al. | 384/613 |
| 4,434,448 | 2/1984 | Bell et al. | 361/23 |

OTHER PUBLICATIONS

"Application of Active Magnetic Bearings to Industrial Rotating Machinery—ACTIDYNE", Societe de Mecanique Magnetique, 27204 Vernon Cedex, France, date unknown.

"The Active Magnetic Bearing Enables Optimum Control of Machine Vibrations", 18 pgs., by Helmut Habermann and Maurice Brunet, Societe de Mecanique Magnetique, 27204 Vernon Cedex, France, date unknown.

Primary Examiner—Stuart S. Levy
Assistant Examiner—David Werner
Attorney, Agent, or Firm—Fitch, Even, Tabin & Flannery

[57] ABSTRACT

A bearing system includes backup bearings for supporting a rotating shaft upon failure of primary bearings. In the preferred embodiment, the backup bearings are rolling element bearings having their rolling elements disposed out of contact with their associated respective inner races during normal functioning of the primary bearings. Displacement detection sensors are provided for detecting displacement of the shaft upon failure of the primary bearings. Upon detection of the failure of the primary bearings, the rolling elements and inner races of the backup bearings are brought into mutual contact by axial displacement of the shaft.

11 Claims, 1 Drawing Figure

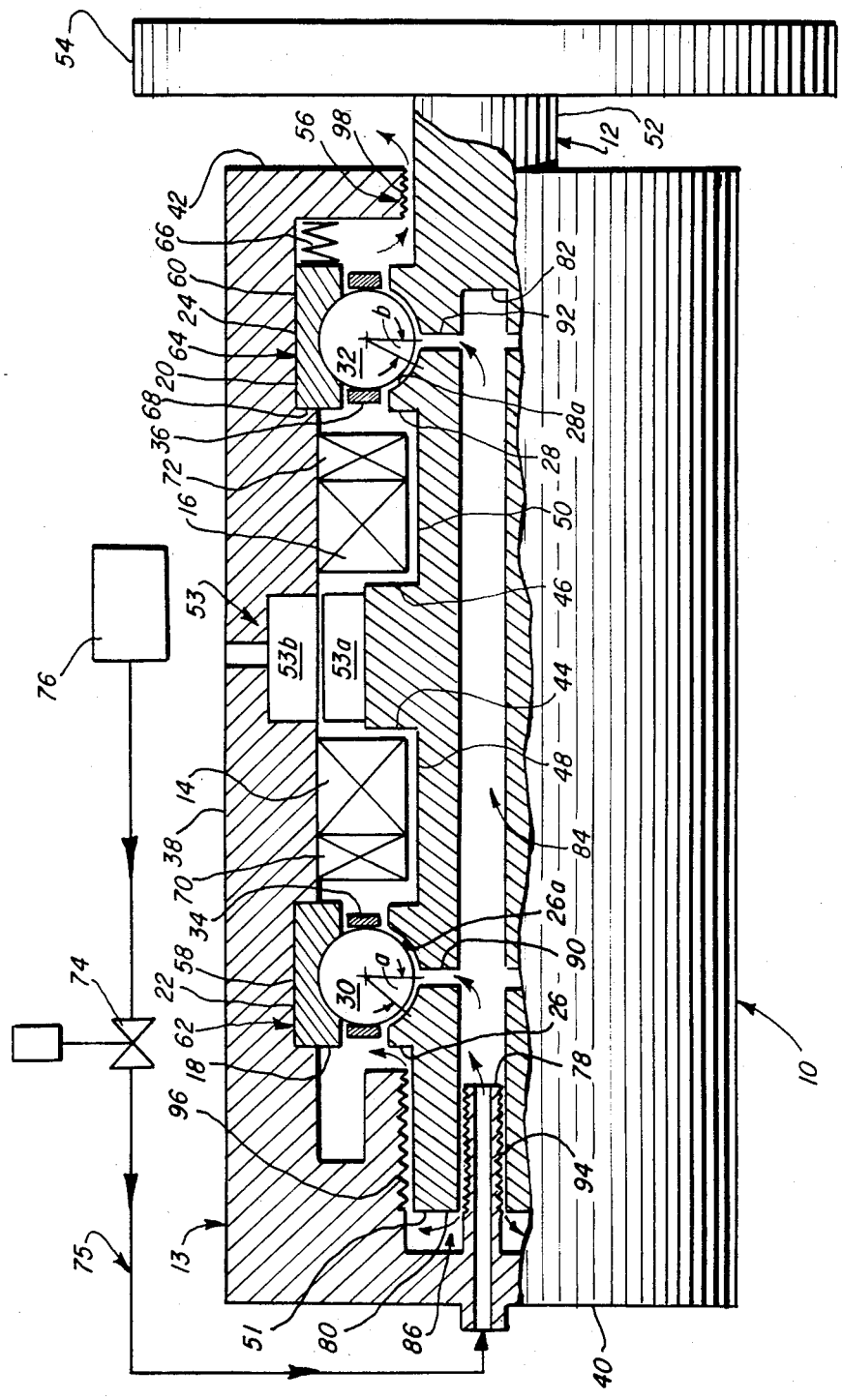

BEARING SYSTEM

BACKGROUND OF THE INVENTION

The U.S. Government has rights in this invention pursuant to Contract No. DE-ATO3-84SF11963.

The invention relates generally to bearing systems and more particularly to a bearing system wherein a shaft is supported by primary bearings under normal conditions and is supported by backup or secondary bearings upon failure of the primary bearings.

Although not limited to any particular application, the invention will be described in connection with a motor driven turbine. In such applications, the detection of failure of the primary bearings and the automatic shifting of the loads to the backup bearings is justified from cost and safety standpoints.

Bearing assemblies wherein backup or secondary bearings are provided to support loads upon failure of primary bearings are shown and described in U.S. Pat. No. 3,708,215; U.S. Pat. No. 3,454,309; and U.S. Pat. No. 4,425,010. Means for detecting shaft displacement due to bearing wear are disclosed in U.S. Pat. No. 4,434,448.

SUMMARY OF THE INVENTION

It is a general object of the present invention to provide an improved bearing system wherein backup or secondary bearings support a rotating shaft upon failure of one or more primary bearings.

It is a more particular object of the present invention to provide a bearing system wherein forced axial displacement of a rotating shaft is effected in response to failure of primary bearings to enable support of the shaft by secondary or backup bearings.

It is a further object of the present invention to provide a bearing system including rolling element bearings movable between a first position in which the rolling elements in each bearing contact only one of the associated races and a second position wherein the rolling elements contact both races.

Further objects and features of the invention are set forth below.

BRIEF DESCRIPTION OF THE DRAWING

The FIGURE is a sectional view of a bearing system in accordance with the present invention.

DETAILED DESCRIPTION OF THE PREFERRED EMBODIMENT

Referring to the drawing, the invention is preferably embodied in a bearing system 10 for supporting a rotating shaft 12 on a housing 13. The illustrated bearing system 10 comprises a pair of primary bearings 14, 16 for supporting the shaft 12 under normal conditions and a pair of backup bearings 18 20 for supporting the shaft 12 in the event of failure of one or more of the primary bearings 14, 16. The system 10 is configured so that when the primary bearings 14, 16 are functioning properly, the shaft 12 is maintained in a position such that the backup bearings 18, 20 are not loaded. In the event of failure of the primary bearings 14 and 16, the shaft 12 shifts axially to a position wherein the backup bearings 18, 20 support the shaft 12 axially as well as radially.

Each backup bearing 18, 20 comprises an outer race 22,24; an inner race 26,28; a plurality of rolling elements 30, 32 disposed between its respective races; and a retaining ring 34, 36 for constraining the rolling elements 30, 32.

In accordance with one feature of the present invention, the system 10 is configured so that during normal operation, the rolling elements 30, 32 in each bearing contact only one of its races, and in the event of failure of the primary bearings 14, 16, axial displacement of the shaft 12 brings the other race of each bearing into contact with the associated rolling elements 30, 32.

In accordance with a second feature of the present invention, means are provided to apply axial force to the shaft 12 to displace it to the position wherein it is supported by the backup bearings 18, 20 in response to failure of the primary bearings 14, 16.

Turning to a more detailed description of the illustrated embodiment, the housing 13 comprises a generally cylindrical peripheral wall 38 for supporting the bearings, and has first and second end walls 40, 42 at its opposite ends. The primary bearings 14, 16 are supported on the interior of the peripheral wall 38 of the housing 13. The illustrated primary bearings 14, 16 are non-contacting bearings which employ magnetic fields to support the shaft 12. Such bearings are available from Magnetic Bearings, Inc., Radford, Va. Primary bearings of the type employing a fluid film rather than a magnetic field could also be used.

The shaft 12 has a pair of oppositely-facing transverse surfaces 44, 46 thereon for transmitting thrust loads to the primary bearings 14, 16 through magnetic fields. Radial loads on the shaft are supported by annular longitudinal surfaces 48, 50 adjacent the transverse surfaces 44, 46. The illustrated shaft 12 has its rearward end 51 disposed within the housing and a forward end 52 extending through an opening 56 in the forward end wall 42 of the housing 13.

The bearing system of the present invention might be used in any of various types of systems. The illustrated system 10 is configured for use with a motor-driven turbine. Thus, a rotor 53a and stator 53b for an electric motor 53 may be disposed between the primary bearings 14 and 16, and a turbine 54 may be mounted on the forward end 52 of the shaft 12.

To support the outer races 58, 60 of the backup bearings 18, 20, the peripheral wall 38 of the housing 13 has a pair of annular channels 62 and 64 formed on its interior, one located near the rearward end of the housing 13, and one located near the forward end thereof. It will be appreciated that the distance between the inner races 26 and 28 is subject to dimensional tolerances and thermal strain. Accordingly, it is desirable that the distance between the outer races 22 and 24 be variable. To this end one of the backup bearings (herein, the forward backup bearing 20) preferably has its outer race 24 mounted so as to be axially movable, and the other backup bearing (herein, the rear backup bearing 18) has its outer race 22 locked in position so as to be constrained against axial movement. The rearward channel 62 is dimensioned to fit tightly against the forward and rearward surfaces of the outer race 22 of the rear bearings, and the forward channel 64 has a width or axial dimension greater than the width or axial dimension of the outer race 60 of the bearing 20. The outer race 60 of the forward bearing is biased rearwardly by a spring 66 so as to rest against a rear transverse surface 68 of the forward channel 64 under normal conditions.

In the illustrated embodiment, the backup bearings 18, 20 are angular contact bearings with spherical rolling elements or balls 30, 32. The inner races 26, 28 of the backup bearings 18, 20 are disposed in spaced relation to the balls 30, 32 during normal operation. The inner races 26, 28 are configured so that excessive displacement of the shaft 12 in any direction brings the inner races 26, 28 into contact with their associated balls 30, 32. To this end, each of the annular bearing surfaces 26a, 28a of the inner races 26, 28, as viewed in cross-section as in the FIGURE, defines an annular radius of curvature slightly larger than the radius of the associated balls 30, 32. The inner races 26, 28 are configured so that when the shaft is in the position shown in the FIGURE, the clearances between the inner races 26, 28 and their associated rolling elements 30, 32 are less than the clearances between each of the primary bearings 14, 16 and the corresponding support surfaces 44, 46, 48 and 50 on the shaft 12. This ensures that failure of one or more of the primary bearings 14, 16 will not result in contact between the primary bearings 14, 16 and the shaft 12.

The rear backup bearing 18 preferably bears the majority of the thrust load on the shaft 12. To this end, the spring 66 applies force to the outer race 24 of the forward backup bearing 20 of magnitude less than the thrust load carried by the rear backup bearing 18, and the contact angle "a" of the rear bearing 18 is accordingly greater than the contact angle "b" of the forward bearing 20. The magnitude of the spring force is selected to provide sufficient axial load on the forward bearing 20 to ensure concentricity of the inner races 26, 28.

In the FIGURE, the distances between the inner races 26, 28 and their associated rolling elements 30, 32 have been exaggerated for illustrative purposes. However, the FIGURE is intended to illustrate an embodiment wherein radial clearances are provided between the balls 30, 32 and the inner races 26, 28 and wherein the transverse radius of curvature of the bearing surfaces 26a, 28a—i.e., the radius of curvature of the sections shown in the FIGURE, which are taken along a plane transverse to the direction of movement of the balls 30, 32—is slightly larger than conventional relative to the associated balls 30, 32.

The illustrated backup bearings 18, 20 have their inner races 26, 28 formed integrally on the shaft. It will be appreciated that the inner races in other embodiments may be separate pieces mounted on the shaft 12. As noted above, means are provided to shift the shaft 12 forwardly upon failure of the primary bearings 14 and 16. This is accomplished in the illustrated embodiment by fluid pressure acting against the rear end 51 of the shaft 12.

To sense failure of one or both of the primary bearings 14, 16, a pair of displacement sensors 70, 72 are mounted on the housing 13 adjacent the primary bearings 14, 16. Failure of a primary bearing may be caused by a malfunction of the bearing itself, or by overloading thereof as due to the turbine 54 becoming unbalanced. Either type of failure increases shaft vibration. By way of example only, commercially available displacement sensors 70, 72 may be obtained from Bentley Nevada Corp., Minden, Nev. In response to increased shaft vibration, the displacement sensors 70, 72 send an electric signal to open a normally closed solenoid valve 74 on a line 75 between a source 76 of high pressure fluid and an inlet nozzle 78 at the rear of the housing 13. The inlet nozzle 78 communicates with a chamber 86 defined between a forwardly facing surface 88 on the rear end wall 40 of the housing 13 and the rearwardly facing surface 80 at the rear of the shaft 12. Once the solenoid valve 74 is opened, the high pressure fluid flows from the source 76 through the solenoid valve 74 and through the nozzle 85 into an axial passage 84 in the shaft 12, and rearwardly therefrom into the chamber 86 behind the shaft 12 where it exerts forward pressure on the shaft 12 to shift it into its forward position wherein the shaft is supported by the backup bearings 18, 20.

It may be noted that the fluid also exerts pressure on the surface 82 at the forward end of the passage 84, which contributes additional force to displace the shaft 12 forwardly. The pressure on the shaft 12 is sufficiently high to move it into the forward position even if the forward primary bearing 16 is still functioning properly and opposing such movement.

In the illustrated embodiment, the high pressure fluid functions as a lubricant for the backup bearings 18, 20 in addition to providing pressure for axial displacement of the shaft 12. To this end, the high pressure fluid preferably comprises a mixture of a liquid lubricant such as oil and a gas such as helium, and means are provided to enable the high pressure fluid to flow to the backup bearings 18, 20. Herein, flow to the inner races 26, 28 of the respective backup bearings 18, 20 is provided by a plurality of radially extending passages 90, 92 communicating with the axial bore 84 of the shaft 12. Each of these passages 90, 92 has its inner end at the bore 84, and has its radially outer end at the annular curved surface of the inner race 26, 28 which engages the rolling elements 30, 32 of the respective bearings 18, 20.

To provide additional lubrication for the bearings 18, 20, and particularly for the outer races 22, 24 thereof, fluid flows along the exterior of the shaft 12 near its rear end 51 from the chamber 86 at the rear of the shaft 12 into the space between the shaft and the interior of the housing 13.

It will be appreciated that it is desirable to maintain relatively high pressure in the chamber 86 at the rear of the shaft 12 and in the interior bore 84 of the shaft, while permitting flow of high pressure fluid from the nozzle 78 to the outer races 22, 24 of the backup bearings 18, 20. To this end, labyrinth seals 94, 96 and 98 are employed on the exterior of the nozzle 78 and at the interfaces near the rear end of the housing 13 and the front end of the housing 13 between the housing and the shaft 12. The labyrinth seals 94, 96 and 98 impede flow of high pressure fluid to a sufficient degree that the fluid pressure maintains the shaft 12 in the desired axial position, while permitting sufficient flow of high pressure fluid to enable lubrication of the outer races 22, 24 of the backup bearings 18, 20. Each of the labyrinth seals comprises a series of circumferential grooves machined into an annular surface to create turbulence in axial flow over the surface.

Operation of the bearing system 10 of the illustrated embodiment may be summarized as follows. During normal operation, the shaft 12 rotates on the primary bearings 14, 16, and is maintained concentric with respect thereto. The shaft 12 is loaded primarily by thrust loads urging the shaft 12 forwardly. The inner races 26, 28 of the backup bearings 18, 20 are spaced from the associated rolling elements 30, 32, which herein are balls. The balls 30, 32 are held in place by retaining rings 34, 36 and are stationary during normal functioning of the primary bearings 14, 16. The balls thus do not add to the mass of the shaft 12 and do not create frictional losses to impede rotation of the shaft 12. Neither the balls 30, 32 nor the respective races of the backup bearings 18, 20 are subject to substantial wear while the primary bearings 14, 16 are functioning, and no lubricant is needed for the backup bearings under these circumstances.

Upon failure of one or more of the primary bearings 18, 20, shaft vibration increases are detected by one or both of the displacement sensors 70, 72, resulting in an electric signal which opens the solenoid valve 74. The electric signal may also be operative to interrupt power to the motor 53 if it is desired to limit the time period during which the shaft 12 rotates while supported by the backup bearings 18 and 20.

The shaft vibration may be of sufficient magnitude to cause intermittent contact between the inner races 26, 28 and the rolling elements 30, 32. Due to the clearances described above, the shaft 12 is prevented by the backup bearings 18, 20 from contacting the primary bearings 14, 16 even prior to shifting of the shaft 12 forwardly.

When the solenoid valve 74 opens, high pressure fluid passes from the source 76 through the line 75 and through the nozzle 78 into the axial bore 84 of the shaft 12. From there, a portion of the fluid flows radially outwardly through the passages 90, 92 to the inner races 26, 28 of the respective backup bearings 18, 20. Another portion of the fluid flows rearwardly past the labyrinth seal 94 on the exterior of the nozzle 78 into the chamber 86 at the rear of the shaft 12 to pressurize the chamber 86 and drive the shaft 12 forward, then flows forwardly through the labyrinth seal 96 at the rear of the exterior of the shaft 12, flows through the backup bearings 18, 20 and finally exits the housing 13 through the labyrinth seal 98 at the forward end of the housing 13.

The pressure in the chamber 86 drives the shaft 12 forward so that the inner race 28 of the forward backup bearing 20 moves into contact with its associated rolling elements 32 and begins rotation thereof. Contact occurs along lines which intersect a plane perpendicular to the shaft axis at angle "b". The shaft 12 continues to travel forward, displacing the outer race 24 forwardly and increasing compression of the spring 66. The inner race 26 of the rear backup bearing 18 then moves into contact with its associated rolling elements 30, and the rear backup bearing 18 assumes the major portion of the thrust load on the shaft 12. Contact between the inner race 26 and the elements 30 of the rear backup bearings occurs along lines defining contact angle "a" with a transverse plane. It will be appreciated that the thrust load on the shaft 12 includes loads resulting from turbine 54 as well as the pneumatic force provided by the high pressure fluid. The amount of force which the forward backup bearing 20 exerts in response to forwardly-directed thrust loads on the shaft 12 is determined by the spring 66. The spring force need only be great enough to insure that loading on the forward bearing 20 is sufficient to maintain shaft concentricity.

As the inner races 26, 28 move into contact with their respective sets of rolling elements 30, 32, the rolling elements begin to rotate, and travel in circular paths between their associated inner and outer races. Some friction occurs between the inner races 26, 28 and their respective rolling elements 30, 32 as the rolling elements are accelerated. To minimize such friction, it is desirable that the rolling elements 30, 32 be of relatively low mass.

From the foregoing it will be appreciated that the present invention provides a novel and improved bearing system. While a preferred embodiment of the invention is described and illustrated herein, there is no intent to limit the invention to this or any particular embodiment.

What is claimed is:

1. A bearing system for supporting a rotating shaft on a housing, the bearing system comprising:
   a pair of primary bearings and a pair of backup bearings,
   each said backup bearing comprising an outer race supported on said housing, an inner race on said shaft, a plurality of rolling elements disposed between said races, and a retainer ring for constraining said rolling elements;
   said primary bearings being operative to support said shaft during normal operation in a first predetermined position such that in each of said backup bearings said rolling elements contact only one of said races;
   said backup bearings being configured so that upon axial displacement of said shaft in a predetermined direction from said first predetermined position to a second predetermined position said rolling elements in each bearing contact both races and said shaft is supported by said backup bearings; and
   shaft displacement means for selectively applying axial force to said shaft to displaced said shaft from said first predetermined position to said second predetermined position while said shaft rotates relative to said housing,
   said shaft displacement means including a chamber defined by surfaces on said housing and said shaft and means for introducing high pressure fluid into said chamber.

2. A bearing system in accordance with claim 1 wherein in each said backup bearing, said retainer ring maintains said rolling elements in contact with said outer race so that during normal operation, when said shaft is in said first predetermined position, said rolling elements in each backup bearing are out of contact with their respective associated inner races.

3. A bearing system in accordance with claim 1 wherein the outer race of one of said backup bearings is axially movable and is axially loaded by a spring.

4. A bearing system for supporting an axially loaded shaft on a housing, the bearing system comprising:
   a pair of primary bearings for supporting said shaft under normal conditions during which said shaft rotates in a first axial position, each primary bearing being fixedly mounted on the housing;
   a pair of backup bearings for supporting said shaft in a second axial position upon failure of at least one of said primary bearings; and
   shaft displacement means for axially displacing said shaft from said first axial position to said second axial position upon failure of said at least one of said primary bearings by selectively applying axial force to said shaft,
   said axial force being of sufficient magnitude to shift the shaft to said second axial position when one of said primary bearings is functioning properly and opposing such movement;
   said means for axially displacing said shaft comprising means on said shaft and means on said housing defining a chamber, and means for introducing fluid into said chamber at high pressure.

5. A bearing system in accordance with claim 4 wherein said fluid includes a lubricant and said chamber communicates with said backup bearings so that said fluid provides lubrication therefor.

6. A bearing system in accordance with claim 4 wherein each of said backup bearings comprises a ball bearing having an outer race, an inner race, and a plurality of balls therebetween, and wherein said ball bearings are configured so that when said shaft is in said first position, said balls contact only said outer race.

7. A bearing system in accordance with claim 6 wherein one of said backup bearings has its outer race fixed in a predetermined position on said housing, and the other of said secondary or backup bearings has a movable outer race mounted on said housing so as to be constrained against radial movement and axially movable relative to said housing.

8. A bearing system in accordance with claim 7 further comprising biasing means exerting axial force on said movable outer race.

9. A bearing system comprising:

a housing;

a rotating shaft;

a pair of non-contacting primary bearings mounted on the housing rotatably supporting the shaft concentrically with respect to the primary bearings so that clearances are maintained between the shaft and the primary bearings in the housing;

a pair of backup bearings for rotatably supporting the shaft in the housing in the event of failure of the primary bearings and maintaining concentricity of the shaft with respect to the primary bearings;

each backup bearing comprising an outer race supported on the housing, an inner race on the shaft, a plurality of rolling elements disposed between the races, and a retainer ring for maintaining the rolling elements in contact with the outer race;

the primary bearings supporting the shaft during normal operation in a predetermined position such that in each backup bearing clearances are maintained between the rolling elements and the inner race;

the primary bearings and the secondary bearings being configured so that the clearances in the primary bearings are greater than the clearances in the secondary bearings;

each said backup bearing being an angular contact bearing; and shaft displacement means for shifting the shaft from the predetermined position to a second position upon failure of the primary bearings to effect contact between the inner races of the backup bearings and their respective associated rolling elements for concentric support of the shaft by the backup bearings;

the shaft displacement means comprising:

a source of high-pressure fluid;

means defining a pressure chamber for receiving the high-pressure fluid including rearwardly facing surfaces on the shaft;

a conduit connecting the source of high-pressure fluid to the pressure chamber;

one or more sensors for detecting excessive shaft vibration and emitting an electric signal upon detection of excessive shaft vibration;

an electrically-operated valve operative to open upon receiving the electric signal from the sensors, the valve being effective to selectively prevent or permit flow through the line;

whereby upon occurrence of increased shaft vibration, the electric signal is sent from one or more of the sensors to the valve, opening the valve and permitting high-pressure fluid to enter the chamber and drive the shaft to the second position.

10. A bearing system in accordance with claim 9 wherein the source of high-pressure fluid includes means for introducing liquid lubricant into the high-pressure fluid, and wherein the housing and shaft include means to effect flow of the high-pressure fluid and lubricant to the backup or secondary bearings from the high-pressure chamber.

11. A bearing system in accordance with claim 10 further comprising a turbine mounted on the shaft and loading the shaft axially in response to aerodynamic forces on the turbine.

* * * * *